United States Patent
Menichetti et al.

(10) Patent No.: US 11,163,944 B2
(45) Date of Patent: Nov. 2, 2021

(54) ALIGNMENT OF CONTENT ENTRY WITH ONLINE FORM FIELDS

(71) Applicant: International Business Machines Corporation, Armonk, NY (US)

(72) Inventors: Christophe Menichetti, Montpellier (FR); Ivan Deleuze, Montpellier (FR); Geoffrey Pascal, Montpellier (FR); Guilhaume Garcia, Le Cres (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/748,219

(22) Filed: Jan. 21, 2020

(65) Prior Publication Data

US 2021/0224471 A1 Jul. 22, 2021

(51) Int. Cl.
| | |
|---|---|
| *G06F 40/174* | (2020.01) |
| *G06N 20/00* | (2019.01) |
| *G06N 7/00* | (2006.01) |
| *G06F 16/958* | (2019.01) |

(52) U.S. Cl.
CPC .......... *G06F 40/174* (2020.01); *G06F 16/986* (2019.01); *G06N 7/005* (2013.01); *G06N 20/00* (2019.01)

(58) Field of Classification Search
CPC .......... G06F 40/00; G06F 16/80; G06F 16/90; G06F 40/174; G06F 16/986; G06N 7/00; G06N 20/00; G06N 7/005
See application file for complete search history.

(56) References Cited

U.S. PATENT DOCUMENTS

| | | | |
|---|---|---|---|
| 6,564,213 B1 | 5/2003 | Ortega | |
| 8,423,899 B1 | 4/2013 | Crane | |
| 2002/0198935 A1* | 12/2002 | Crandall, Sr. | ......... G06F 40/174 709/203 |
| 2008/0120257 A1 | 5/2008 | Goyal | |
| 2009/0132950 A1* | 5/2009 | Gibson | ............... G06F 16/2365 715/780 |
| 2014/0150108 A1 | 5/2014 | Low | |
| 2016/0300573 A1* | 10/2016 | Carbune | ............... G06F 40/174 |
| 2017/0083499 A1* | 3/2017 | VanBlon | ............. G06F 3/04883 |
| 2017/0336933 A1 | 11/2017 | Hassel | |
| 2018/0032148 A1* | 2/2018 | Taki | ...................... G06F 40/274 |
| 2018/0181545 A1* | 6/2018 | Qu | ........................ G06F 40/103 |

* cited by examiner

*Primary Examiner* — Sanchita Roy
(74) *Attorney, Agent, or Firm* — David K. Mattheis; Maeve M. Carpenter (57) ABSTRACT

A method to automatically position entered content into a matching entry field of an online form accessed from a computing device. A position of an active cursor relative to entry fields of the online form is determined. An expected character and format set is determined for the entry fields of the online form. A first character and format set entered at a first entry field is analyzed to determine whether the entered character and format set matches an expected characters and format set, based on machine learning training for entry field content and format. In response to the character and format set entered in the first entry field failing to match the expected character and format set for the first entry field, entering the first character and format set in a second entry field with a highest match probability between the expected and entered character and format set.

20 Claims, 4 Drawing Sheets

ALIGNMENT OF CONTENT ENTRY WITH ONLINE FORM FIELDS

FIELD OF THE INVENTION

The present invention relates generally to the field of online data entry, and more particularly to aligning the data type entry to appropriate form fields.

BACKGROUND OF THE INVENTION

Online searches and services enable users to access information and news, purchase items, sign-up and receive subscription services, arrange for delivery, enroll in memberships and many more activities. Often, to participate in searching or other activities, the user is required to enter information into an online form that includes a plurality of entry fields, each with specific designation of the user data to be entered.

User data entry fields vary, based on the type of online activity pursued by the user, but the data entry fields often include identifying the user, locating the user, and may include private information, such as email address, password, account, date of birth, or payment card number, among others. Faced with a plurality of fields, a user often manually navigates the entry of information to an intended field, positioning the entry point by moving a display screen cursor or caret to the desired position.

SUMMARY

Embodiments of the present invention disclose a method, computer program product, and system. The embodiments include a method for positioning content entry to an appropriate entry field of an online form. The method provides for one or more processors to identify a type of entry field of a plurality of entry fields, respectively, of an online form accessed from a computing device of a user. The one or more processors determine a position of an active cursor with respect to the plurality of entry fields, respectively, of the online form. The one or more processors determining an expected set of characters and format of the one or more entry fields, respectively, of the online form. The one or more processors analyzing a first set of characters and format entered at a first entry field corresponding to the position of the active cursor. The one or more processors determining whether the set of characters and format entered in the first entry field matches the expected set of characters and format of the first entry field, based on machine learning training of the expected sets of characters and format of the plurality of entry fields, respectively, of the online form, and in response to determining the set of characters and format entered in the first entry field of the online form fails to match the expected set of characters and format for the first entry field, the one or more processors changing the position of the active cursor to a second entry field of the online form having a highest probability of match with the set of characters and format entered in the first entry field of the online form.

DETAILED DESCRIPTION

Embodiments of the present invention recognize that entry of a user's information into an online form often encounters situations in which the position of the active cursor, which designates the point of insert of user input, is actually at a different position or different entry field than anticipated by the user. In such situations, the user's entry effort is wasted and requires re-entry, once the position of the active cursor is corrected, resulting in inefficiency, frustration, and poor user-experience. In some extreme cases, the user may abandon the effort and pursue other avenues for the desired activity.

Embodiments of the present invention acknowledge that in some situation involving online form completion on a user's mobile device, entry of information while the active cursor is in an entry field or a position that differs from the user's anticipated entry field, may result in full display of sensitive or personal information, such as, for example, a password, account number, or a social security identification number (SSN). Open exposure of sensitive or personal information even in semi-public areas may compromise the user, often without their awareness.

Embodiments of the present invention provide for a method, computer program product, and computer system for automatically positioning content entry to an appropriate entry field of an online form based on a machine-learning match between entered content and expected content of an entry field. Embodiments include applying machine learning techniques, such as supervised learning with labeled data, to determine a type of data associated with a particular entry field of an online form. A type of data includes a set of characters and may include a format of the characters, both of which correspond to a designated category of content to be entered into the particular entry field of the online form. For example, an entry field designated for "First Name" would include a text entry and typically has a character limit, whereas a "Phone Number" entry field would include numeric characters, may include hyphens and parenthesis, and may have a specific number of characters to enter. Machine learning techniques may include a large plurality of valid entry content, including a set of characters and format of the characters, along with labeling of the entry content that identifies the entered set of characters and format as corresponding to an expected type of entry for a particular entry field of an online form.

Embodiments of the present invention consider content entered in an entry field of an online form as including a set of characters and may include a particular format of the characters corresponding to the type of content expected in the particular entry field. An online form is comprised of multiple fields in which character data may be entered, and the point of entering of character data is determined by an active cursor located on a display component of a computing device. In some embodiments, the active cursor may be referred to as a/the caret, and may have various forms, based on the computing device, the operating system of the computing device, and the preference settings of the user of the computing device. In some embodiments, the active cursor blinks to indicate the "active" attribute, and the location of the cursor indicates the point to which entered content is intended to be displayed.

Embodiments of the present invention recognize that the active cursor may not be positioned in an entry field of the online form as a user enters a set of characters having a particular format. In other embodiments, the cursor may be located in a first entry field; however, the user fails to recognize the location of the cursor and assumes the cursor position is located in a second entry field, setting up a situation in which the wrong information is entered into the second entry field, and must be recognized, removed, and re-entered in the appropriate first entry field. In other embodiments, the user enters the expected content characters and format into a first entry field, but also includes additional character content in the first entry field that is expected in a second entry field and possibly other subsequent fields. For example, the user may enter the street address, City, State, and Zip Code data into a first entry field that requires only the street address and must remove and re-enter the additional data in the appropriate subsequent entry fields of the online form.

Embodiments of the present invention refer to content entered, or entered content, as the set of characters and the format of the characters associated with the particular entry field of the online form to which the user intended to input the entered content. In some embodiments of the present invention, a brief delay may occur in inserting and displaying entered content in the entry field of the online form for embodiments to determine whether the set of characters and format of the characters entered match an expected type of data for the entry field in which the active cursor is located. The delay may correspond to the amount of content entry required to recognize the type of data entered, based on a probability level determined as a result of applying machine learning techniques. The entered content is recognized by determining a highest probability of the type of data to which the entered content aligns, and subsequent to determining the highest probability of the entered content determined as a particular type of data, embodiments of the present invention input the entered content into the entry field corresponding to the determined highest probability. In some embodiments of the present invention, the highest probability associated with content entered in an entry field of the online form must exceed a pre-determined threshold value for embodiments to alter the input of the entered content to an entry field that differs from the position of the active cursor.

Embodiments of the present invention identify entry fields of an online form, and the type of data anticipated or expected for entry into respective entry fields, based on the software source code of the online form and may include web page code that includes the online form. Additionally, metadata tags and labels within the software source code designate a particular entry field, which defines the type of data as the expected entry of content. Online form web page software code includes metadata tags identifying the entry field of the online form, and an expected type of content comprised of a set of characters and format associated with a particular entry field type. For example, a date entry field may expect a four-digit year, separated from a two-digit month ranging from 1-12, and a two-digit day ranging from 1-31.

Figure 1:
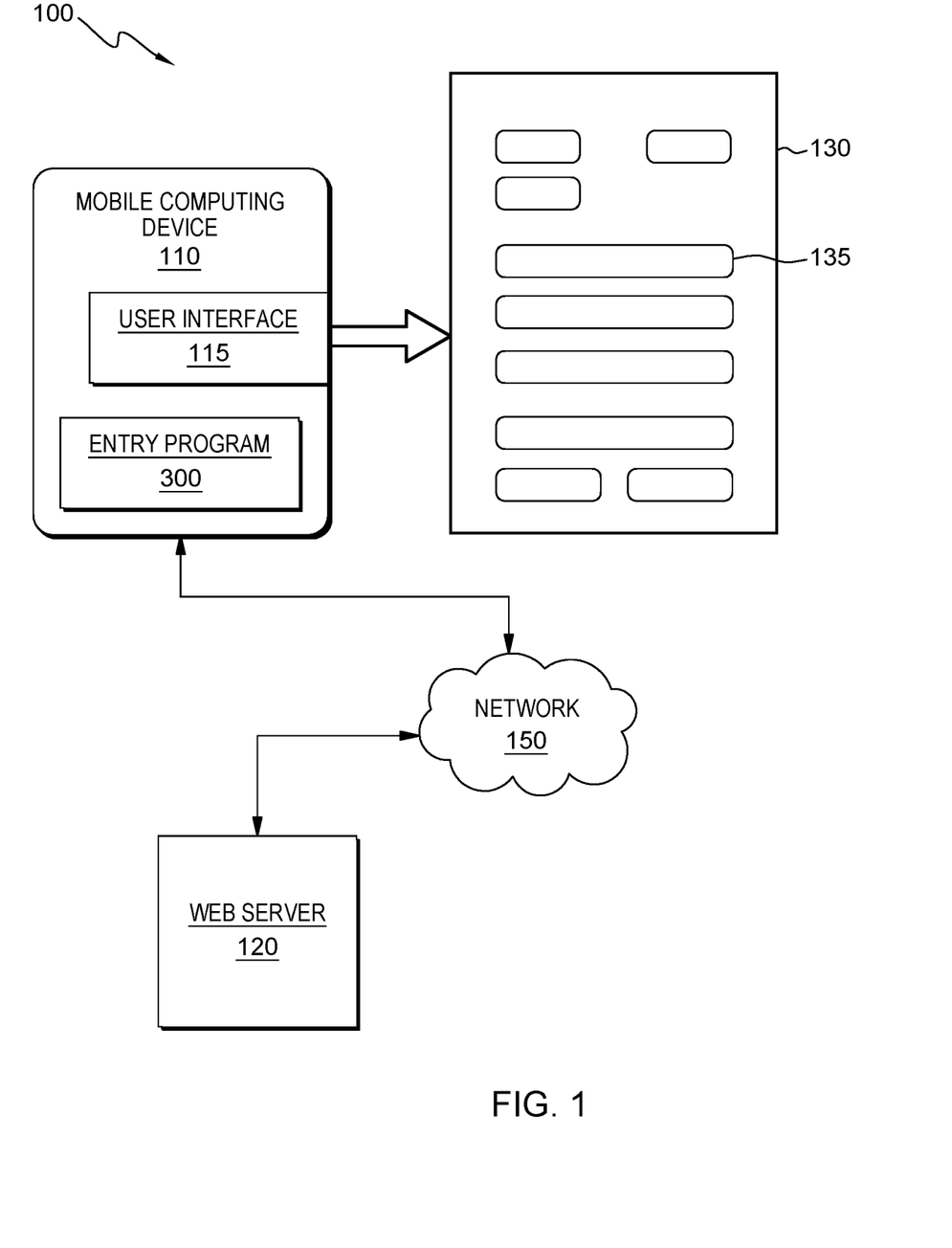
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, web server 120 and online form 130, which includes entry field 135 that represents one of a plurality of entry fields of online form 130, all connected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support connection to and communications between computing device 110, web server 120, and online form 130, in accordance with embodiments of the present invention.

In some embodiments of the present invention, computing device 110 is a mobile smart device and includes user interface 115, and entry program 300. Computing device 110 is depicted as communicatively connected to web server 120 and providing access to online form 130 via user interface 115. In some embodiments, computing device 110 can be a standalone mobile computing device, a smart phone, a tablet computer, a smart watch, a smart TV, a laptop computer, or any other mobile electronic device or computing system capable of receiving, sending, and processing data. In other embodiments, computing device 110 can be a computing device interacting with applications and services hosted and operating in a cloud computing environment. In another embodiment, computing device 110 can be a netbook computer, a desktop computer, a personal digital assistant (PDA), or other programmable electronic device capable of communicating with web server 120, and other computing devices (not shown) within distributed data processing environment 100 via network 150. In embodiments of the present invention, computing device 110 is configured to access and display online form 130 via user interface 115. Computing device 110 includes internal and external hardware components, depicted in FIG. 4.

User interface 115 provides an interface to access features and functions of computing device 110. In some embodiments of the present invention, user interface 115 provides access to entry program 300, operating on computing device 110. User interface 115 also supports access, display, and interact with online form 130 by connection to a web page of web server 120, as well as other applications, features, and functions of computing device 110 (not shown). User interface 115 supports access to alerts, notifications, and other forms of communications. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of computing device 110. User interface 115 enables a user of computing device 110 to receive, view, hear, and respond to input, access applications, and perform functions available.

Entry program 300 operates on computing device 110 and performs actions to identify the entry fields, such as entry field 135 of online form 130, accessed from a web page hosted by web server 120 and transmitted and displayed on computing device 110 via user interface 115. Entry program 300 analyzes the software source code of online form 130 and identifies the entry fields of online form 130 and determines a type of data expected in each respective entry field, based on the software source code of online form 130 and tags and labeling associated with each respective entry field. Entry program 300 determines the position of the active cursor within the display of online form 130 and identifies the entry field in which the active cursor is positioned. In some embodiments, the active cursor may not be positioned within an entry field of online form 130.

Entry program 300 analyzes the content entered by the user of computing device 110 and compares the type of data entered to the type of data expected in the plurality of entry fields, respectively, of online form 130. Entry program 300 determines a probability of the content entered aligning with the data type expected in the respective entry fields of online form 130 and inserts the entered content into the entry field corresponding to the highest probability of alignment. In some embodiments, entry program 300 determines whether the highest probability determined exceeds a pre-determined threshold and proceeds to insert the entered content in response to the determined probability exceeding the pre-determined threshold. In some embodiments, if the highest probability determined fails to exceed the pre-determined threshold, entry program 300 prevents display of the entered content, and presents the user with a notification. In some embodiments the notification may be directed to the position of the active cursor located outside of detected entry fields. In other embodiments, the notification may be directed to failure to recognize the intended entry field for the entered content.

Web server 120 is a web-based computer communicatively connected to computing device 110 via network 150, and hosts web content that includes online form 130 as a linked component of a web page hosted on web server 120 and accessible to computing device 110. Web server 120 is within distributed data processing environment 100, in accordance with embodiments of the present invention. In some embodiments of the present invention, web server 120 can represent a server computing system utilizing multiple computers as a server system, such as in a cloud computing environment. In another embodiment, web server 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100, via network 150. In another embodiment, web server 120 represents a computing system utilizing clustered computers and components (e.g., database server computers, application server computers, etc.) that act as a single pool of seamless resources when accessed within distributed data processing environment 100. Web server 120 may include internal and external hardware components, as depicted and described in further detail with respect to FIG. 4.

Online form 130 is web-based electronic form or document accessible from web server 120 via network 150. Online form 130 includes entry field 135, which represents one entry field of a plurality of entry fields included within online form 130. In some embodiments, entry field 135 may include a combination of sets of characters and formats for entry fields, such as, but not limited to: date, time, first name, last name, street address, city, state, zip code, gender, age, phone number, email address, user ID, password/passcode, payment card, account number, employer, and emergency contact. In some embodiments of the present invention, entry program 300 accesses the software source code to render online form 130 on a display user interface of computing device 110 while loading on computing device 110. In some embodiments, entry program 300 analyzes the software source code of online form 130 to identify entry fields and determine expected type of data as entered content. Entry field 135 is identified within the software source code of online form 130 by specific tags associated with the entry field, and labels indicating a type of data expected as entered content.

Figure 2:
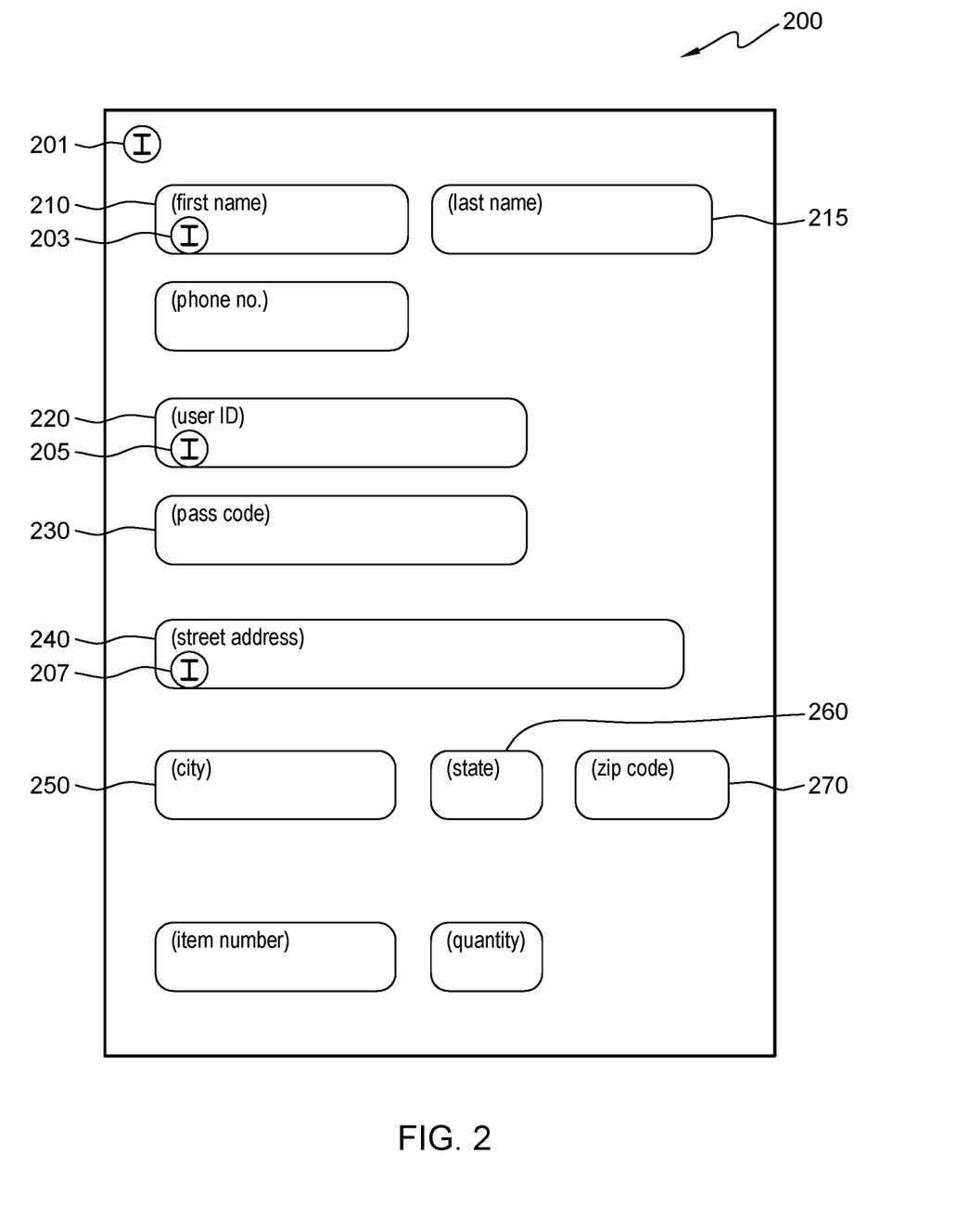
FIG. 2 illustrates an example online form including a plurality of entry fields, in accordance with embodiments of the present invention.

FIG. 2 illustrates an example online form 200, including a plurality of entry fields, in accordance with embodiments of the present invention. Online form 200 includes first name field 210, last name field 215, user identification (ID) field 220, pass code field 230, street address field 240, city field 250, state field 260, and zip code field 270. Online form 200 also includes active cursor 201, 203, 205, and 207, depicted in various positions on online form 200, and respectively representing different and non-simultaneous example scenarios of online form 200 displayed on user interface 115 of computing device 110.

In an example embodiment of the present invention, active cursor 201 is depicted outside entry fields of online form 200 (with active cursors 203, 205, and 207 not applicable to the current example). In some embodiments of the present invention, a user entering content into an entry field of online form 200 may be unaware of the exact position of active cursor 201 or assume cursor 201 is positioned within the entry into which the user intends to enter content. In response to determining the active cursor is positioned outside of the entry fields of online form 200, entry program 300 analyzes the entered content from the user and determines the probability of the content matching the expected set of characters and format associated with the respective entry fields of online form 200, and directs the insert of the entered content to the entry field corresponding to the highest probability determined.

In an example embodiment of the present invention, active cursor 203 is the single active cursor (active cursors 201, 205, and 207 are not applicable for the current example embodiment) and is located within first name field 210. A user entering content includes a first name and a last name, not noticing a separate last name field 215 the user's last name. Entry program 300 determines that the additional character entry is not part of the first name of the user, recognizes the entered extra characters as the user's last name, and appropriately inserts the entered extra characters into last name field 215 of online form 200.

In an example embodiment of the present invention, active cursor 205 is the single active cursor (active cursors 201, 203, and 207 are not applicable for the current example embodiment) and is positioned within user ID field 220 of online form 200, and active cursor 205 is the only active cursor displayed on computing device 110. In some embodiments, the user mistakenly assumes the cursor is within pass code field 230 and enters the set of characters and format of the user's pass code. Because of the mistaken position of active cursor 205, the pass code of the user would otherwise be displayed openly without hiding and may compromise the user's security associated with the pass code. In embodiments of the present invention, entry program 300, prior to inserting the entered content by the user, analyzes the content during entry and determines that the set of characters and format entered has a low probability match with user ID field 220, but has a much higher probability match with pass code field 230. Entry program 300 directs the insert of the entered content by the user to pass code field 230, which in an example scenario has already been coded to hide pass code entry and, therefore, avoiding exposure of the user's pass code due to the mistaken assumption of the active cursor position. In addition, directing the pass code entry of content to the appropriate pass code field 230 prevents wasted time for the user that would have to remove the incorrect entry, and re-enter the correct content in user ID field 220.

In yet another example embodiment of the present invention, active cursor 207 is the single active cursor (active cursors 201, 203, and 205 are not applicable for the current example embodiment) and is positioned within street address field 240. In one embodiment of the present invention, active cursor 207 is the only active cursor displayed on computing device 110. A user enters a set of characters in street address field 240 but also includes the city, state, and zip code information, not recognizing city field 250, state field 260 and zip code field 270, as separate fields for the additional address components. Entry program 300 analyzes the entered content of the user and determines that additional address elements are included in the entry to street address field 240, and in response, determines the probability of matching other fields of online form 200. Entry program 300 determines the city, state, and zip code components of the input content and directs the component input content to the corresponding entry fields of city field 250, state field 260 and zip code field 270 of online form 200, without the user having to edit and re-enter the form data.

Figure 3:
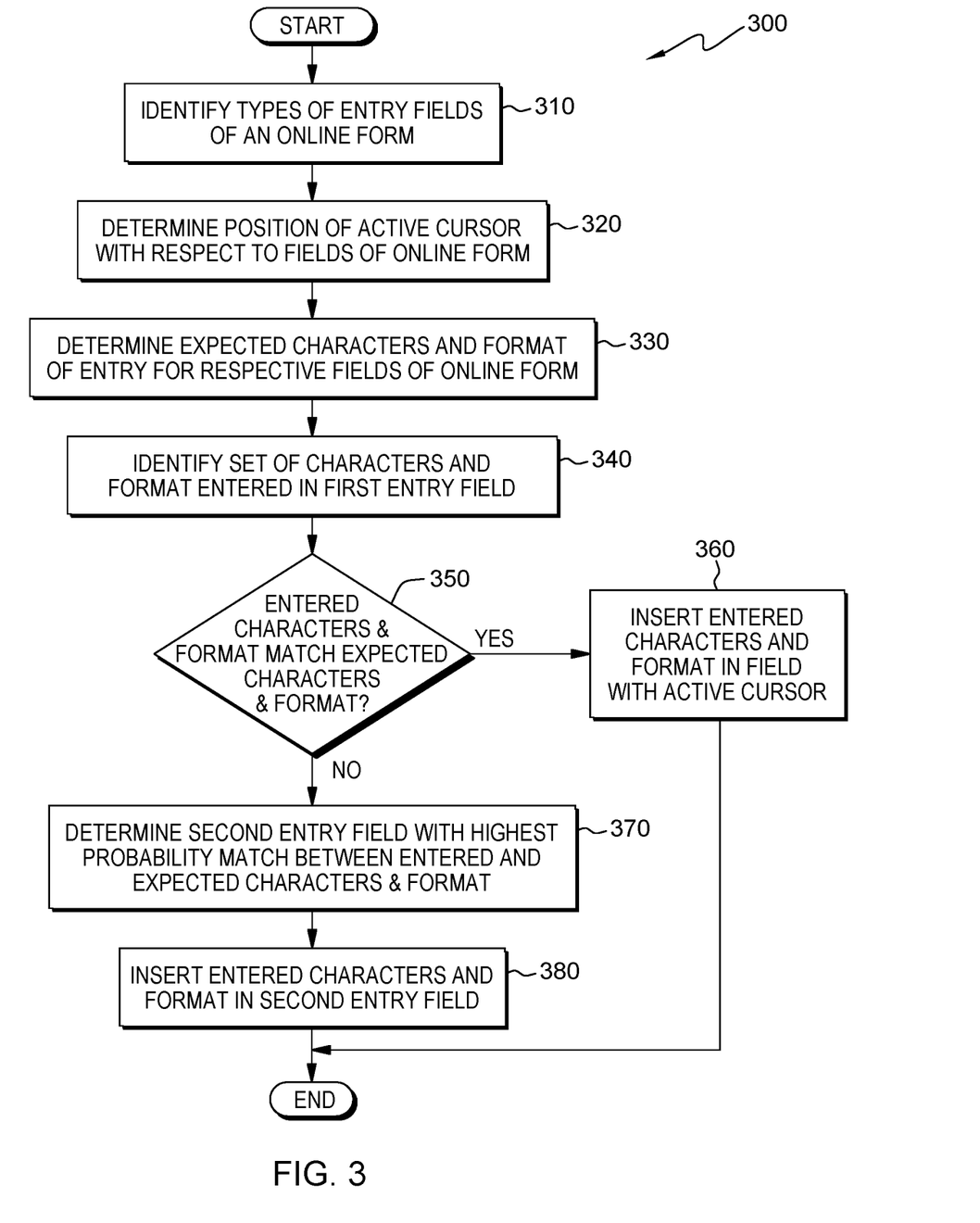
FIG. 3 is a flowchart depicting operational steps of an entry program, operating in the distributed data processing environment of FIG. 1, in accordance with embodiments of the present invention.

FIG. 3 is a flowchart depicting operational steps of entry program 300, operating in distributed data communications environment 100, in accordance with embodiments of the present invention. In embodiments of the present invention, entry program 300 includes machine learning techniques used to identify entry fields of online forms and determine the type of input data expected for a respective entry field of an online form. In some embodiments, the software code tag syntax indicating an entry field for various web programming languages is used across a large plurality of labeled examples of entry fields. Commenting and labeling of various entry field types are also included in the machine learning techniques to enable determination of expected data type as a set of characters and format of the entered data. Entry program 300 is trained by repetitive use of a variety and plurality of entry fields of online forms, as well as a plurality of example input content corresponding to each entry field type. In embodiments of the present invention, a user has accessed an online form and proceeds to enter content in fields of the online form, triggering entry program 300.

Entry program 300 identifies the types of entry fields of an online form (step 310). In some embodiments of the present invention, entry program 300 is actively deployed on a computing device of a user and detects the user accesses of an online form. Entry program 300 scans the software source code associated with the accessed online form and identifies the types of entry fields included in the online form. Entry program 300 determines the entry fields by the software code tags associated with the entry fields and determines the type of field by the tag syntax, labels associated with the entry field, or both. For example, entry program 300 scans the software code of online form 200 (FIG. 2) as it is received by computing device 110 (FIG. 1). Entry program 300 identifies the entry fields of online form 200 by recognition of the entry field tags and can determine a type of input content expected based on a label associated with the respective entry field, and the previously performed machine learning techniques.

Entry program 300 detects the position of the active cursor with respect to the entry field of the online form (step 320). In some embodiments of the present invention, entry program 300 determines a position of the active cursor controlled by an input device of the computing device loading and displaying the online form. Entry program 300 determines the active cursor position relative to the position areas of the identified entry fields of the online form, establishing whether the active cursor is in a particular entry field of the online form, or whether the active cursor is outside an entry field of the online form, or outside of the online form, such as active within another window or field outside of the online form.

For example, entry program 300 determines whether the active cursor is located within an entry field of online form 200, such as active cursor 203, positioned in first name field 210 of online form 200, displayed on computing device 110. In some embodiments, entry program 300 determines that the active cursor, such as active cursor 201 is positioned outside of entry fields of online form 200.

Entry program 300 determines an expected set of characters and format of entry for respective fields of the online form (step 330). In some embodiments of the present invention, the position of the active cursor is used to determine the expected set of characters and format of the characters entered in the online form at the active cursor position. In some embodiments, the active cursor is positioned within a particular entry field identified by software code tags of the online form, and the type of input content or data expected is determined by the label and/or comment within the software code of the online form associated with the particular entry field, as determined by machine learning training. In some embodiments, the expected set of characters may include recognizable combinations of characters, such as a first name from libraries of first names of people or may include recognizable terms such as "street", "avenue", "road", or "drive", preceded by a numeric designation, for example, as indicating a street address. Entry program 300 includes an expected set of characters and format for a particular entry field based on machine learning utilizing a plurality of entry field examples in supervised learning techniques.

In some embodiments in which entry program 300 determines that the active cursor position is outside an entry field of the online form, entry program 300 does not utilize an expected type of data of a set of characters or an expected format and does not display entered content until a determination of the type of data and a highest probability match of the entered content with an entry field of the online form is determined. In some embodiments, if the entered content results in a probability of matching the expected set of characters and format associated with the entry fields of the online form that fails to exceed a pre-determined threshold probability, then entry program 300 inhibits the display of the entered characters and format and presents the user with a notification. In some embodiments, the notification may suggest the user validate the position of the active cursor, whereas in other embodiments, the notification may suggest the user to validate the entered content, and in still other embodiments, the notification may include both a suggestion to validate the position of the active cursor and validate the entered content.

Entry program 300 identifies the set of characters and format of the characters entered in a first entry field (step 340). Entry program 300 analyzes the user input and identifies the set of characters as entered and the format of the characters as entered. For example, entry program 300 analyzes the user input and identifies that the entered content contains only alpha characters, six characters in length and corresponding to a first name of "Robert" as determined from supervised learning of data types of designated entry fields for first names. In another example, entry program 300 analyzes the input from a user and identifies the entered content is all numeric, containing ten numerals in sections of three, three, and four, separated by hyphens, and recognizes the input as a phone number, based on machine learning training.

Entry program 300 determines whether the entered set of characters and format of the characters match the expected set of characters and format of the active cursor position (decision step 350). In some embodiments, the active cursor is located within an entry field of the online form and the entry field is associated with an expected data type to be entered, such as a set of characters and format of the characters that correspond to the software code tag and labels of the particular entry field. Entry program 300 determines whether the set of characters and the format of the characters entered by the user match the expected characters and format of the data type of the entry field.

For the case in which the entered set of characters and format of the entered characters match the expected characters and format associated with the first entry field in which the active cursor is located (step 350, "YES" branch), entry program 300 inserts the entered characters and format of the characters in the first entry field in which the active cursor is located (step 360). For example, entry program 300 determines that the entered characters and format are consistent with an email address format, and entry program 300 determines that the first entry field in which the active cursor is located corresponds to an email entry field that includes a label for "email address," indicating a match. Entry program 300 inserts the entered set of characters and the format of the characters into the email entry field (first entry field) of the online form and displays the entered content on the display of computing device 110.

For the case in which the entered set of characters and format of the entered characters fail to match the expected characters and format associated with the entry field in which the active cursor is located (step 350, "NO" branch), entry program 300 determines a second entry field with a highest probability of match between the entered set of characters and format of the characters and the expected characters and format (step 370). Entry program 300 compares the data type of the input content with the expected data type of the identified entry fields of the online form, in which the data type includes a set of characters and the format associated with the set of characters. Entry program 300 determines a second entry field having the highest probability of match between the expected set of characters and format and the set of characters and format of the characters entered by the user, and in some embodiments, the highest probability of match exceeds a pre-determined threshold. Having identified the second entry field having the highest probability of match and exceeding the pre-determined threshold, entry program 300 inserts the set of characters and the format of the characters entered by the user in the second entry field (step 380) and displays the entered content on the display of the user's computing device.

For example, entry program 300 determines that the input content entered by the user of computing device 110, such as a password including a mix of alpha, numeric, upper case, and special characters without spaces, does not match the expected set of characters and format of the characters associated with the current active cursor position, such as the user email address entry field. Entry program 300 expects the input content to include an "@" and an ".com" component in a properly formatted email address, and failing to identify the components, proceeds to compare the input to the expected set of characters and format of characters corresponding to the identified entry fields of the online form, and generates a probability of the input content matching the expected content for each entry field.

Entry program 300 determines the entry field with the highest probability of match, (and in some cases, determines that the pre-determined threshold probability is exceeded) and inserts the entry by the user and displays the entered content in the highest probability entry field. In some embodiments, the entry field is previously programmed to not display the entered content, such as a personal identification number (PIN) or password. In such cases entry program 300 inputs the entered content in the determined entry field, but the prior coding behavior of the entry field, such as hiding or disguising the entry, prevails.

Referring back to step 350, in other embodiments, the active cursor is located outside of an entry field of the online form, and entry program 300 receives and analyzes the set of characters and format of the characters entered by the user (step 340) but does not make a comparison of the input characters and format to an expected set of characters and format. Entry program 300 determines the type of data entered and based on the machine learning training associated with various types of entry fields of a plurality of online forms, entry program 300 determining a highest probability of the set of characters and format of characters entered by the user matching an identified entry field of the online form (step 370).

In some embodiments in which the highest probability of the set of characters and format of characters entered by the user matching an identified entry field of the online form fails to exceed a pre-determined threshold, entry program 300 inhibits the display of the entered set of characters and presents the user with a notification indicating an inadequate match of entered characters and entry fields of the online form.

Figure 4:
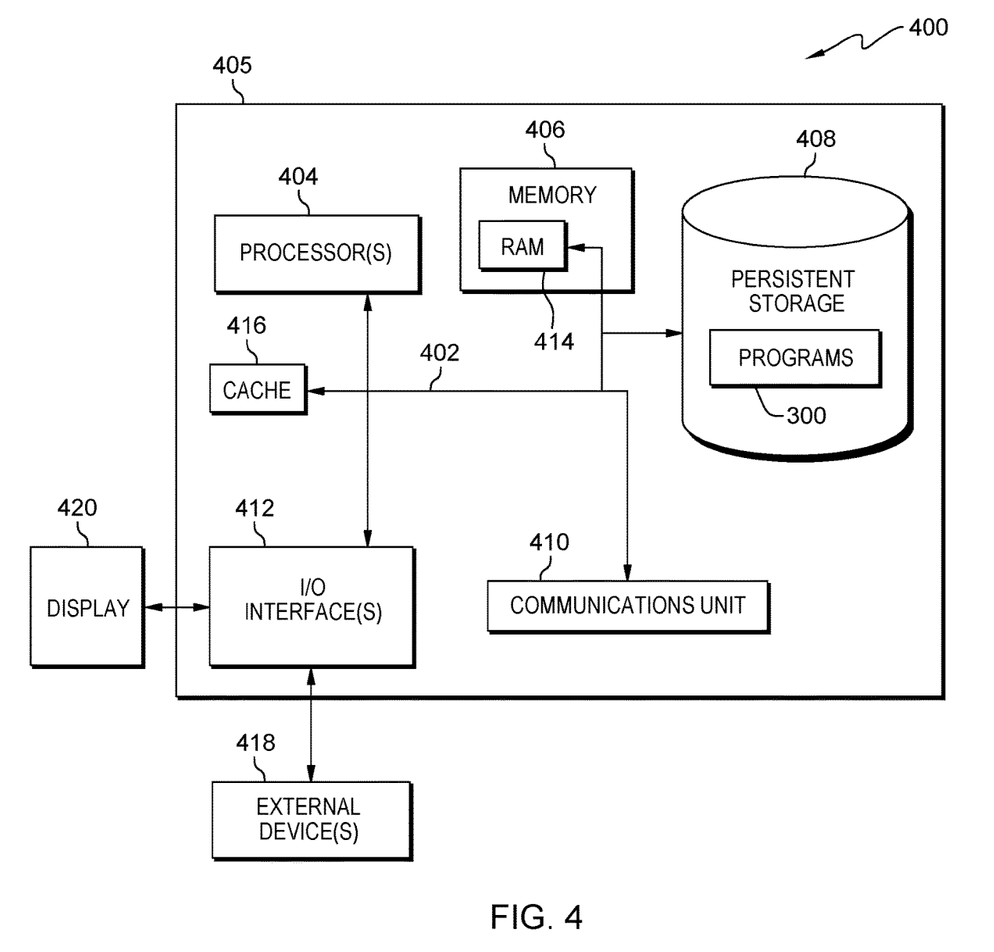
FIG. 4 depicts a block diagram of components of a computing system, including a computing device configured with capability to operationally perform the entry program of FIG. 3, in accordance with an embodiment of the present invention.

FIG. 4 depicts a block diagram of components of computing system 400, including computing device 405, configured to include or operationally connect to components depicted in FIG. 1, and capable of performing operational steps of protection program 300 of FIG. 3, in accordance with an embodiment of the present invention, in accordance with an embodiment of the present invention.

Computing device 405 includes components and functional capability similar to components of computing device 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

In one embodiment, entry program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Entry program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g. entry program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for positioning content entry to an appropriate entry field of an online form, the method comprising:

one or more processors determining a position of an active cursor relative to respective positions of a plurality of entry fields of an online form;

the one or more processors determining for each of the plurality of entry fields of the online form, a respective expected set of characters and format;

the one or more processors identifying a set of characters and format entered at a first entry field corresponding to the position of the active cursor;

the one or more processors determining a probability of the set of characters and format entered in the first entry field matching the expected set of characters and format associated with the first entry field, based on, for each of the plurality of entry fields of the online form, machine learning training of the expected sets of characters and format; and in response to determining the set of characters and format entered in the first entry field of the online form fails to match the expected set of characters and format corresponding to the first entry field, the one or more processors determining a set of secondary probability matches for each of the plurality of entry fields of the online form, wherein the secondary probability match for a particular entry field of the online form is the probability match between (i) the set of characters and format entered in the first entry field of the online form and (ii) the expected set of characters and format of the particular entry field of the online form; and the one or more processors changing the position of the active cursor and the characters and format entered in the first entry field to a second entry field of the online form, wherein the second entry field corresponds to a highest secondary probability match in the set of secondary probability matches.

2. The method of claim 1, further comprising:

in response to determining that the secondary probability match of a respective entry field of the plurality of entry fields of the online form exceeds a pre-determined threshold, the one or more processors displaying the set of characters and format in the respective entry field of the online form having the highest secondary probability match in the set of secondary probability matches.

3. The method of claim 1, wherein the one or more processors determining an expected set of characters and format as an entry in the first entry field of the online form, further comprises:

the one or more processors analyzing a metadata tag and code of web page content including the online form; and the one or more processors identifying a type of entry of characters and a type of format of the characters entered for each respective field of the online form, based on the metadata tag of the online form and the code associated with the respective field.

4. The method of claim 1, further comprising:

the one or more processors delaying a display of the set of characters and format entered in the first entry field of the online form until an analysis is completed of a match between (i) the set of characters and format entered in the first entry field of the online form and (ii) the expected set of characters and format corresponding to the first entry field.

5. The method of claim 1, wherein the set of characters and format entered into the first entry field of the online form is recognized as corresponding to a particular type of entry field of the online form, based on the machine learning training utilizing a plurality of labeled sets of characters and formats labeled to correspond to the particular type entry field of the online form.

6. The method of claim 1, further comprising:
in response to determining the active cursor for data entry of the set of characters and format of the set of characters is not positioned in an entry field of the plurality of entry fields of the online form, the one or more processors inhibiting display of the set of characters and format entered;
the one or more processors determining whether the set of characters and format entered matches an expected set of characters and format of an entry field of the plurality of entry fields of the online form; and
in response to determining the set of characters and format entered fails to match an expected set of characters and format of an entry field of the online form, the one or more processors presenting a notification to the user regarding the position of the cursor.

7. The method of claim 1, further comprising:
in response to determining that the probability of the set of characters and format entered matching the expected set of characters and format of a respective entry field of the plurality of entry fields of the online form fails to exceed a pre-determined threshold, the one or more processors inhibiting display of the set of characters and format entered; and
the one or more processors presenting a notification to the user.

8. A computer program product for positioning content entry to an appropriate entry field of an online form, the computer program product comprising:
one or more computer readable storage media; and
program instructions stored on the one or more computer readable storage media, the program instructions comprising:
program instructions to determine a position of an active cursor relative to respective positions of a plurality of entry fields of the online form;
program instructions to determine for each of the plurality of entry fields of the online form, a respective expected set of characters and format;
program instructions to identify a set of characters and format entered at a first entry field corresponding to the position of the active cursor;
program instructions to determine a probability of the set of characters and format entered in the first entry field matching the expected set of characters and format associated with the first entry field, based on, for each of the plurality of entry fields of the online form, machine learning training of the expected sets of characters and format;
in response to determining the set of characters and format entered in the first entry field of the online form fails to match the expected set of characters and format corresponding to the first entry field, program instructions to determine a set of secondary probability matches for each of the plurality of entry fields of the online form, wherein the secondary probability match for a particular entry field of the online form is the probability match between (i) the set of characters and format entered in the first entry field of the online form and (ii) the expected set of characters and format of the particular entry field of the online form; and
program instructions to change the position of the active cursor and the characters and format entered in the first entry field to a second entry field of the online form, wherein the second entry field corresponds to a highest secondary probability match in the set of secondary probability matches.

9. The computer program product of claim 8, further comprising:
in response to determining the secondary probability match of a respective entry field of the plurality of entry fields of the online form exceeds a pre-determined threshold, program instructions to display the set of characters and format in the respective entry field of the online form having the highest secondary probability match in the set of secondary probability matches.

10. The computer program product of claim 8, wherein program instructions to determine an expected set of characters and format as an entry in the first entry field of the online form, further comprises:
program instructions to analyze a metadata tag and code of web page content including the online form; and
program instructions to identify a type of entry of characters and a type of format of the characters entered for each respective field of the online form, based on the metadata tag of the online form and the code associated with the respective field.

11. The computer program product of claim 8, further comprising:
program instructions to delay a display of the set of characters and format entered in the first entry field of the online form until an analysis is completed of a match between (i) the set of characters and format entered in the first entry field of the online form and (ii) the expected set of characters and format corresponding to the first entry field.

12. The computer program product of claim 8, wherein program instructions recognize that the set of characters and format entered into the first entry field of the online form as corresponding to a particular type of entry field of the online form, based on the machine learning training utilizing a plurality of labeled sets of characters and formats labeled to correspond to the particular type entry field of the online form.

13. The computer program product of claim 8, further comprising:
in response to determining the active cursor for data entry of the set of characters and format of the set of characters is not positioned in an entry field of the plurality of entry fields of the online form, program instructions to inhibit display of the set of characters and format entered;
program instructions to determine whether the set of characters and format entered matches an expected set of characters and format of an entry field of the plurality of entry fields of the online form; and
in response to determining the set of characters and format entered fails to match an expected set of characters and format of an entry field of the online form, program instructions to present a notification to the user regarding the position of the cursor.

14. The computer program product of claim 8, further comprising:
in response to determining the probability of the set of characters and format entered matching the expected set of characters and format of a respective entry field of the plurality of entry fields of the online form fails to exceed a pre-determined threshold, program instructions to inhibit display of the set of characters and format entered; and program instructions to present a notification to the user.

15. A computer system for positioning content entry to an appropriate entry field of an online form, the computer system comprising:
one or more computer processors;
one or more computer readable storage media; and program instructions stored on the one or more computer readable storage media, the program instructions comprising:
program instructions to determine a position of an active cursor relative to respective positions of the plurality of entry fields of the online form;
program instructions to determine, for each of the plurality of entry fields of the online form, a respective expected set of characters and format;
program instructions to identify a set of characters and format entered at a first entry field corresponding to the position of the active cursor;
program instructions to determine a probability of the set of characters and format entered in the first entry field matching the expected set of characters and format associated with the first entry field, based on, for each of the plurality of entry fields of the online form, machine learning training of the expected sets of characters and format;
in response to determining the set of characters and format entered in the first entry field of the online form fails to match the expected set of characters and format corresponding to the first entry field, program instructions to determine a set of secondary probability matches for each of the plurality of entry fields of the online form, wherein the secondary probability match for a particular entry field of the online form is the probability match between (i) the set of characters and format entered in the first entry field of the online form and (ii) the expected set of characters and format of the particular entry field of the online form; and
program instructions to change the position of the active cursor and the characters and format entered in the first entry field to a second entry field of the online form, wherein the second entry field corresponds to a highest secondary probability match in the set of secondary probability matches.

16. The computer system of claim 15, further comprising:
in response to determining that the secondary probability match of a respective entry field of the plurality of entry fields of the online form exceeds a pre-determined threshold, program instructions to display the set of characters and format in the respective entry field of the online form having the highest secondary probability match in the set of secondary probability matches.

17. The computer system of claim 15, wherein program instructions to determine an expected set of characters and format as an entry in the first entry field of the online form, further comprises:
program instructions to analyze a metadata tag and code of web page content including the online form; and
program instructions to identify a type of entry of characters and a type of format of the characters entered for each respective field of the online form, based on the metadata tag of the online form and the code associated with the respective field.

18. The computer system of claim 15, further comprising:
program instructions to delay a display of the set of characters and format entered in the first entry field of the online form until an analysis is completed of a match between (i) the set of characters and format entered in the first entry field of the online form and (ii) the expected set of characters and format corresponding to the first entry field.

19. The computer system of claim 15, further comprising:
in response to determining the active cursor for data entry of the set of characters and format of the set of characters is not positioned in an entry field of the plurality of entry fields of the online form, program instructions to inhibit display of the set of characters and format entered;
program instructions to determine whether the set of characters and format entered matches an expected set of characters and format of an entry field of the plurality of entry fields of the online form; and in response to determining the set of characters and format entered fails to match an expected set of characters and format of an entry field of the online form, program instructions to present a notification to the user regarding the position of the cursor.

20. The computer system of claim 15, further comprising:
in response to determining the probability of the set of characters and format entered matching the expected set of characters and format of a respective entry field of the plurality of entry fields of the online form fails to exceed a pre-determined threshold, program instructions to inhibit display of the set of characters and format entered; and
program instructions to present a notification to the user.

* * * * *